United States Patent [19]

Scheffer et al.

[11] Patent Number: 4,697,658

[45] Date of Patent: Oct. 6, 1987

[54] TOGGLE-TYPE ADJUSTABLE MOUNTING FOR WEIGHING SCALE FLEXURES

[75] Inventors: Daniel G. Scheffer, Rockaway Township, Morris County; Marilyn A. Brock, Morris Plains, both of N.J.

[73] Assignee: Ohaus Scale Corporation, Florham Park, N.J.

[21] Appl. No.: 892,812

[22] Filed: Aug. 4, 1986

[51] Int. Cl.[4] .................... G01G 3/08; G01G 23/14
[52] U.S. Cl. ...................................... 177/229; 177/164
[58] Field of Search ...................... 177/164, 229, 255

[56] References Cited

U.S. PATENT DOCUMENTS

| 2,291,142 | 7/1942 | Brown | 265/27 |
|---|---|---|---|
| 2,334,326 | 11/1943 | Hem | 265/39 |
| 3,022,844 | 2/1962 | Gabloffsky | 177/190 |
| 3,734,218 | 5/1973 | Kupper | 177/203 |
| 3,847,238 | 11/1974 | Hall et al. | 177/255 |
| 4,043,415 | 8/1977 | Luchinger | 177/255 |
| 4,109,738 | 8/1978 | Kunz | 177/212 |
| 4,153,126 | 5/1979 | Knothe et al. | 177/229 |
| 4,184,557 | 1/1980 | Kunz | 177/229 |
| 4,382,479 | 5/1983 | Lee et al. | 177/189 |
| 4,383,586 | 5/1983 | Lee | 177/229 |
| 4,485,881 | 12/1984 | Tramposch et al. | 177/211 |
| 4,519,464 | 5/1985 | Stuart | 177/244 |
| 4,526,245 | 7/1985 | Ruf et al. | 177/160 |
| 4,561,512 | 12/1985 | Tramposch | 177/229 |
| 4,653,600 | 3/1987 | Melcher et al. | 177/229 |

FOREIGN PATENT DOCUMENTS

| 7115570 | 9/1971 | Fed. Rep. of Germany . |
| 3003862 | 8/1981 | Fed. Rep. of Germany . |

Primary Examiner—George H. Miller, Jr.
Attorney, Agent, or Firm—Robert R. Jackson

[57] ABSTRACT

A toggle-type adjustment device is provided for allowing very fine adjustments of the position of at least one flexure mounting in a weighing scale.

8 Claims, 8 Drawing Figures

U.S. Patent   Oct. 6, 1987   Sheet 1 of 3   4,697,658
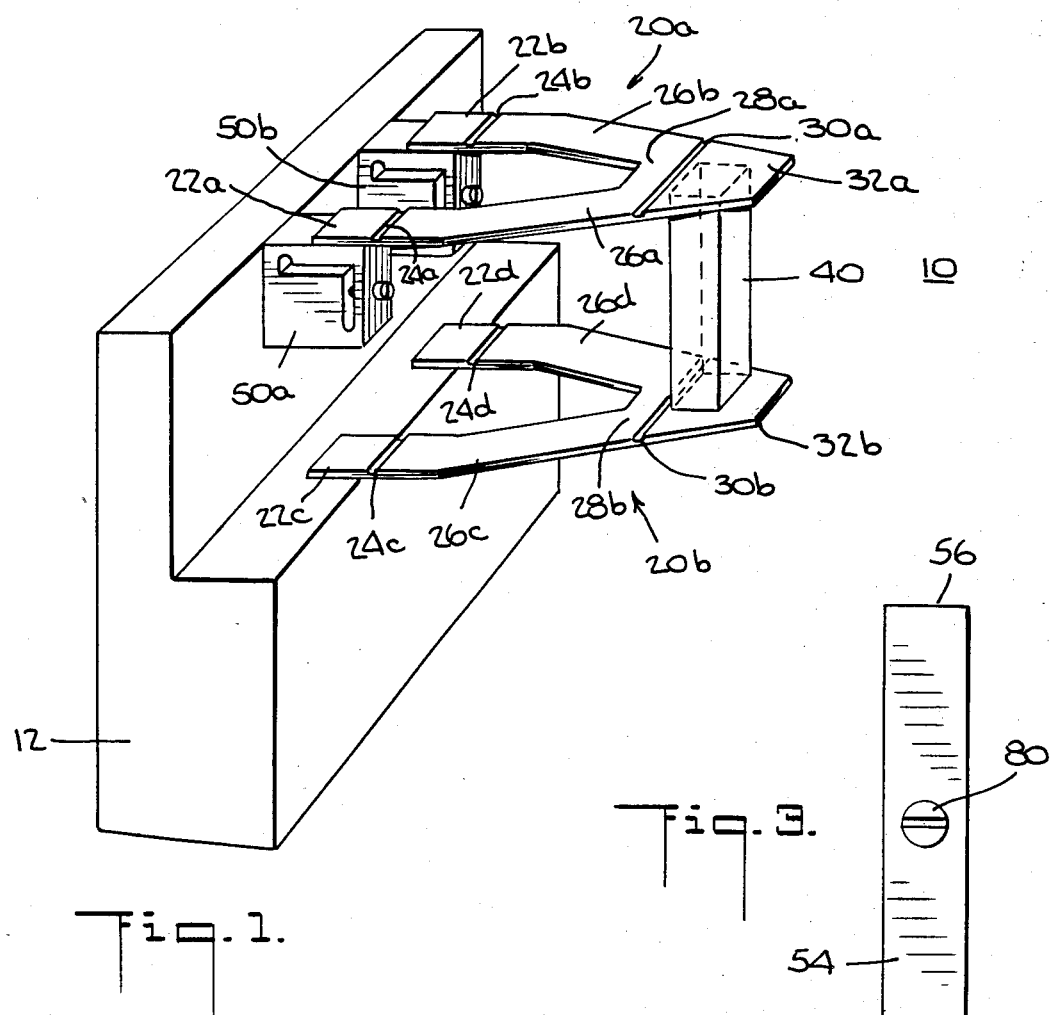
Fig. 1.
Fig. 3.
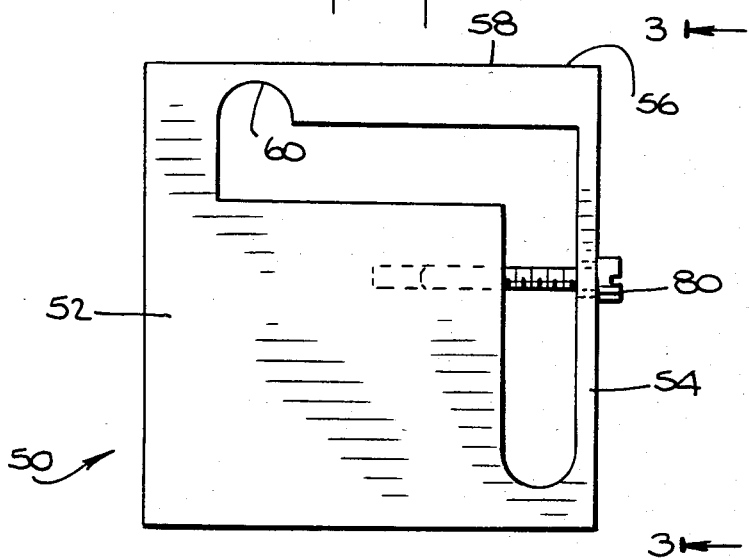
Fig. 2.

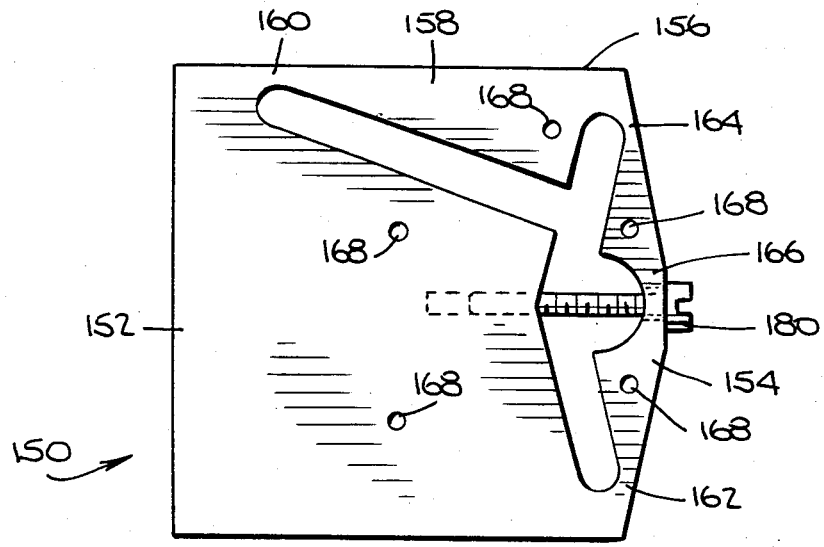
Fig. 4.
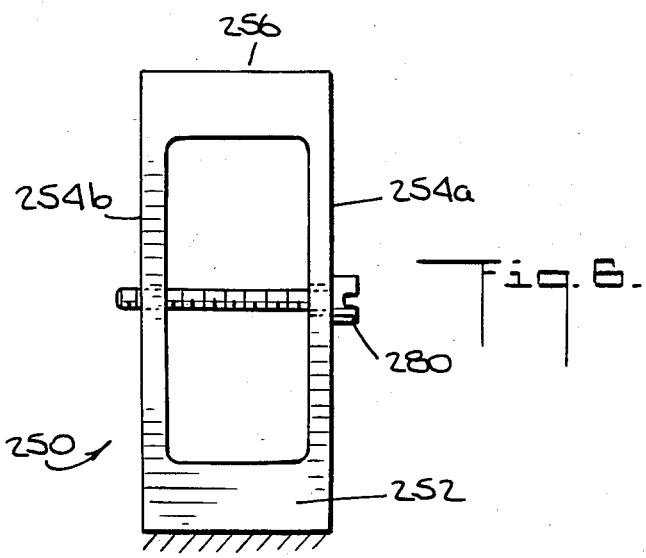
Fig. 6.
Fig. 5.
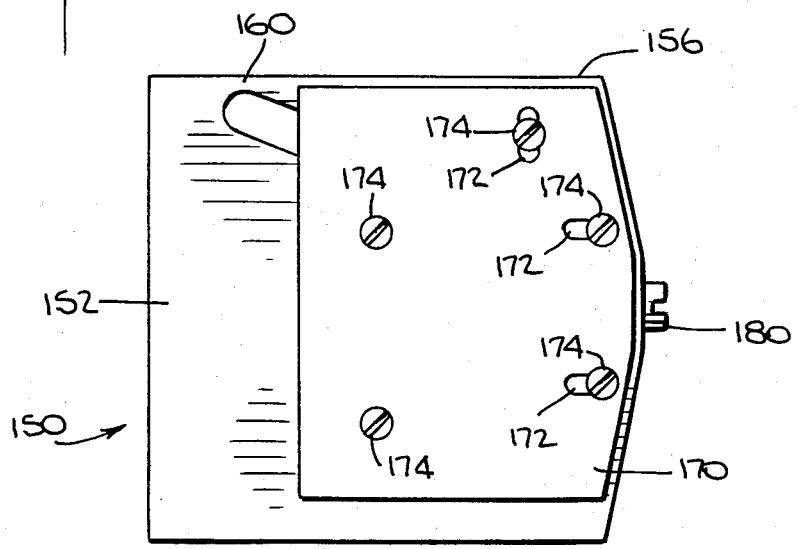

TOGGLE-TYPE ADJUSTABLE MOUNTING FOR WEIGHING SCALE FLEXURES

BACKGROUND OF THE INVENTION

This invention relates to weighing scales, and more particularly to adjustment mechanisms for the mountings of the flexures of such scales.

Weighing scales with parallel, V-shaped or triangular flexures are well known, as shown, for example, in Lee U.S. Pat. No. 4,383,586. Exact parallelism of the flexures in such scales is extremely important for satisfactory operation of the scale. Scales of this type therefore typically have some kind of mechanism for adjusting the location of one or more of the flexure mountings to ensure parallelism of the flexures. For example, in the Lee patent, upper flexure mountings 136b and 136c are respectively mounted on elongated members 124 and 126 which can be pivoted by screws 130 and 131 to adjust the vertical locations of mountings 136b and 136c. While the Lee structure is said to have the advantage of permitting "vernier control" of the locations of the flexure mountings, the Lee structure is also fairly large and bulky.

A more common type of flexure mounting adjustment is shown in Knothe et al. U.S. Pat. No. 4,153,126. In Knothe FIGS. 3 and 4 upper flexure mountings 9a are adjustable by rotation of adjusting screws 10. It is extremely difficult to achieve fine adjustments with a structure of this type. Adjusting screws of very small pitch are relatively expensive, and even with such screws, only a relatively coarse adjustment is possible.

In view of the foregoing, it is an object of this invention to improve the adjustment mechanisms for the flexure mountings in weighing scales.

It is a more particular object of this invention to provide relatively small flexure mounting adjustment mechanisms which allow extremely fine adjustments over a wide range without the use of excessively costly components.

SUMMARY OF THE INVENTION

These and other objects of the invention are accomplished in accordance with the principles of the invention by mounting a toggle mechanism between the rigid base or frame of the scale and each flexure mounting to be adjusted. The toggle mechanism has a control device such as an adjustment screw for causing relatively large displacements of the input portion of the toggle mechanism. The flexure mounting to be adjusted is connected to the output portion of the toggle mechanism. The toggle mechanism converts the relatively large displacements of the input portion produced by the control device to relatively small displacements of the output portion. Accordingly, extremely fine adjustments of the flexure mounting can be achieved with a relatively coarse control device.

Further features of the invention, its nature and various advantages, will be more apparent from the accompanying drawings and the following detailed description of the invention.

BRIEF DESCRIPTION OF THE DRAWINGS

FIG. 1 is a simplified perspective view of a portion of a weighing scale constructed in accordance with the principles of this invention.

FIG. 2 is a side elevational view of the adjustment device employed in the apparatus of FIG. 1.

FIG. 3 is an end elevational view of the adjustment device of FIG. 2.

FIG. 4 is a view similar to FIG. 2 showing an alternative embodiment of the adjustment device of this invention.

FIG. 5 shows the adjustment device of FIG. 4 with some optional additional elements added.

FIG. 6 is a view similar to FIG. 2 showing another alternative embodiment of the adjustment device of this invention.

DETAILED DESCRIPTION OF THE INVENTION

Figure 7:
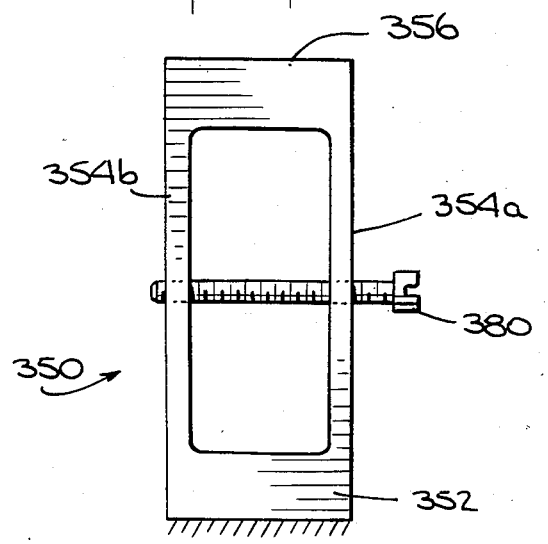
FIG. 7 is a view similar to FIG. 2 showing yet another alternative embodiment of the invention.

As shown in FIG. 1, a top loading scale of the type shown, for example, in the above-mentioned Knothe and Lee patents typically includes a flexure system 10 comprising a portion 12 of th rigid base of the scale on which two vertically spaced, parallel, horizontal flexures 20a and 20b are mounted. Each flexure 20 includes two laterally spaced mounting tabs 22a, 22b, 22c, and 22d, each of which is connected to an associated flexure arm 26a, 26b, 26c, and 26d by a flexural hinge 24a, 24b, 24c, and 24d. The mounting tabs 22c and 22d of flexure 20b are connected directly to base portion 12. The mounting tabs 22a and 22b of flexure 20a are respectively connected to base portion 12 via identical adjustment devices 50a and 50b.

The ends of the arms 26 of each flexure 20 remote from mounting tabs 22 converge toward one another and interconnect at 28a and 28b. Each interconnected portion 28a and 28b is respectively connected to another mounting tab 32a and 32b via another flexural hinge 30a and 30b. Mounting tabs 32 are interconnected by vertical post 40. In a typical top loading scale, post 40 supports a weighing pan (not shown, but entirely conventional) and conveys the load of that pan and the object to be weighed to a transducer mechanism (also not shown, but also entirely conventional; see, for example, the above-mentioned Knothe patent which shows both a typical weighing pan and a typical transducer). Flexure members 20 are intended to ensure that post 40 can only move vertically.

In order for flexures 20 to perform their vertical guidance function without introducing errors into the resulting weight readings, especially when the object to be weighed is not exactly vertically aligned with post 40, flexures 20 must be exactly parallel to one another. As will now be described, adjustment devices 50 allow very fine adjustments of the vertical locations of mountings tabs 22a and 22b to facilitate attainment of the required parallelism between flexures 20.

Each adjustment device 50 (shown in greater detail in FIGS. 2 and 3) is a toggle-type device having a base portion 52, an input portion 54, and an output portion 56. Base portion 52 is connected to scale base portion 12. A flexure mounting tab 22 is connected to output portion 56. A control device (e.g., screw 80) is connected between input portion 54 and base portion 52. Except for screw 80, adjustment device 50 is preferably machined from a single piece of plate metal (e.g., a spring material such as aluminum, beryllium copper, or stainless steel with a coefficient of thermal expansion similar to that of vertical post 40).

The shank of screw 80 passes freely through an aperture in the midportion of input portion 54 and is threaded into base portion 52. Output portion 56 is restrained from moving horizontally by arm 58 which is connected at one end to base portion 52 via flexural hinge 60, and which is connected at the other end to output portion 56. Input portion 54 is a relatively thin member which flexes relatively easily when screw 80 is tightened from the position shown in FIG. 2. Accordingly, when screw 80 is tightened in this way and input portion 54 flexes toward base portion 52, input portion 54 pulls output portion 56 down in the manner of a toggle mechanism which is at or very close to full extension. Because the toggle mechanism is thus at or close to full extension, relatively large deflections of input portion 54 produce only relatively small downward motions of output portion 56. Accordingly, a relatively coarse adjustment of screw 80 can be used to produce a very fine adjustment of the vertical postion of output portion 56.

When the desired adjustment has been made, screw 80 holds adjustment device 50 in the desired adjusted position.

The embodiment of the adjustment device shown in FIGS. 1-3 is merely illustrative of the principles of the invention, and the adjustment device can take many other forms. For example, FIG. 4 illustrates an adjustment device 150 in which the tightening of screw 180 causes upward (rather than downward) motion of output portion 156. Adjustment device 150 comprises base portion 152, input portion 154, and output portion 156 (to which a flexure mounting tab 22 can be connected). Horizontal motion of output portion 156 is prevented by arm 158 which is connected at one end to output portion 156 and at the other end to base portion 152 (via flexural hinge 160). One end of input portion 154 is connected to base portion 152 via flexural hinge 162. The other end of input portion 154 is connected to output portion 156 via flexural hinge 164. The midportion of input portion 154 forms yet another flexural hinge 166. The shank of screw 180 passes freely through an aperture in the midportion of input portion 154 and is threaded into base portion 152. Because input portion 154 is initially bowed outwardly away from base portion 152, when screw 180 is tightened and input portion 154 flexes inwardly, output portion 156 will be pushed upwardly by the toggle action of input portion 154. Because input portion 154 acts like a nearly fully extended toggle, a relatively large inward deflection of input portion 154 produces only a relatively small upward motion of output portion 156. Accordingly, very fine mounting tab adjustments can be produced using a relatively coarse control device such as screw 180.

FIG. 4 (in conjunction with FIG. 5) illustrates another feature of the invention. Pretapped holes 168 can be provided in each of base portion 152, input portion 154, and arm 158 near output portion 156. After adjustment device 150 has been adjusted as desired by rotation of screw 180, fixing plate 170 can be secured to the side of adjustment device 150 by means of screws 174 as shown in FIG. 5. The shanks of screws 174 pass freely through apertures 172 in fixing plate 170 and are threaded into holes 168. The apertures 172 aligned with the holes 168 in the movable parts 154 and 158 of adjustment device 150 are somewhat elongated in the direction in which those holes move during adjustment of device 150. When all of screws 174 are tightened, fixing plate 170 helps prevent any subsequent undesired movement of adjustment device 150.

Yet another alternative embodiment is illustrated in FIG. 6. In this embodiment, adjustment device 250 is substantially symmetrical about a central vertical axis. Base portion 252 is connected along its bottom surface to scale base portion 12. Input portion 254 consists of two substantially parallel arms 254a and 254b extending upwardly from base portion 252. Output portion 256 connects the upper ends of arms 254a and 254b. A control device (i.e., screw 280) extends between the midportions of arms 254. The shank of screw 280 passes freely through the midportion of arm 254a and is threaded into the midportion of arm 254b. Accordingly, when screw 280 is tightened, arms 254 flex toward one another and pull output portion 256 downward.

The embodiment of FIG. 7 is similar to the embodiment of FIG. 6 except that in FIG. 7 screw 380 is threaded through the midportion of arm 354a, and the end of the screw bears on the midportion of arm 354b. Accordingly, when screw 380 is tightened, it pushes arms 354 apart, thereby pulling output portion 356 down.

Figure 8:
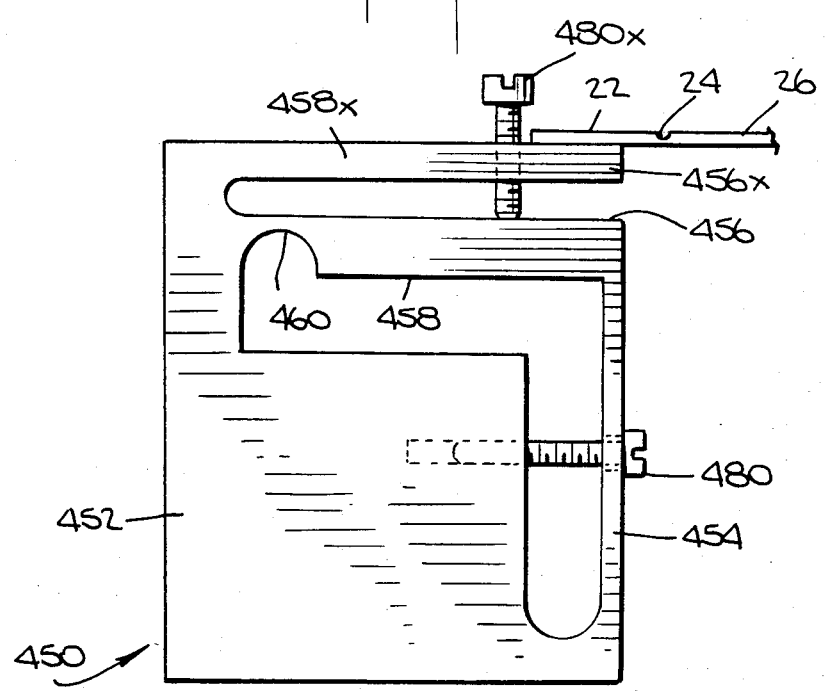
FIG. 8 is a view similar to FIG. 2 showing still another alternative embodiment of the invention.

If desired, a coarse adjustment can be combined with the fine adjustment provided by the toggle-type adjustment device of this invention. For example, FIG. 8 shows an adjustment device 450 similar to the one shown in FIGS. 1-3 to which a coarse adjustment has been added. Arm 458x is cantilevered from base portion 452 so that it extends over output portion 456. A coarse adjustment screw 480x is threaded through arm 458x so that it bears on output portion 456. Flexure mounting tab 22 is mounted on the end 456x of arm 458x so that end 456x is now the final output portion of the device. Accordingly, the vertical position of mounting tab 22 can be coarsely adjusted by rotating screw 480x. A fine adjustment of the vertical position of mounting tab 22 can then be made by rotating screw 480. Of course, the end of screw 480x must firmly contact output portion 456 at all times.

We claim:

1. Apparatus for adjusting the position of a flexure mounting in a weighing scale having a base and at least one flexure mounting comprising:

toggle means having a base portion, an input portion, and an output portion, a relatively large displacement of the input portion relative to the base portion causing a relatively small displacement of the output portion relative to the base portion;

means for connecting the base portion to the base of the weighing scale;

means for connecting the flexure mounting to the output portion; and control means for moving the input portion relative to the base;

wherein the input portion comprises a bendable longitudinal first member connected at one end to the base portion and at the other end to the output portion so that bending of the first member causes displacement of the output portion parallel to the longitudinal axis of the first member.

2. The apparatus defined in claim 1 wherein the control means operates by applying a force to an intermediate portion of the first member transverse to its longitudinal axis to bend the first member.

3. The apparatus defined in claim 2 wherein the control means is an adjustment screw in contact with the intermediate portion of the first member, the longitudinal axis of the screw being transverse to the longtudinal axis of the first member.

4. The apparatus defined in claim 1 further comprising means for substantially preventing motion of the output portion except parallel to the longitudinal axis of the first member.

5. The apparatus defined in claim 1 wherein the toggle means further comprises a bendable longitudinal second member connected at one end to the base portion, the other end of the second member comprising the output portion and being connected to said other end of the first member.

6. The apparatus defined in claim 5 wherein the longitudinal axes of the first and second members are substantially perpendicular to one another.

7. The apparatus defined in claim 5 wherein the second member includes a flexural hinge.

8. The apparatus defined in claim 1 further comprising means for fixing at least one of the input and output portions to the base portion after the position of the flexure mounting has been adjusted as desired.

* * * * *